May 16, 1933. B. BURNS 1,909,041
PRIME MOVER DIFFERENTIAL
Filed July 18, 1930 3 Sheets-Sheet 2

INVENTOR:
BRUCE BURNS
BY
ATTORNEY.

May 16, 1933.   B. BURNS   1,909,041
PRIME MOVER DIFFERENTIAL
Filed July 18, 1930   3 Sheets-Sheet 3

INVENTOR:
BRUCE BURNS
BY Ford Mauin
ATTORNEY.

Patented May 16, 1933

1,909,041

UNITED STATES PATENT OFFICE

BRUCE BURNS, OF LOS ANGELES, CALIFORNIA, ASSIGNOR TO HUGHES DEVELOPMENT COMPANY, LTD., A CORPORATION OF DELAWARE

PRIME-MOVER DIFFERENTIAL

Application filed July 18, 1930. Serial No. 468,789.

This invention relates to a prime-mover differential mechanism and is particularly directed to a mechanism forming a differential driving connection between a prime-mover and a pair of opposed driven elements, extending axially in the same direction as said prime-mover.

It is an object of the invention to provide a self contained prime-mover differential unit in which the differential mechanism is carried by the prime-mover for bodily movement therewith without individual rotation of its parts during a normal drive, so that only during a compensating drive will there be relative rotation between said prime-mover and the parts constituting said differential mechanism.

Another object is to provide a prime-mover differential unit including a prime-mover and a pair of opposed driven shafts operatively connected by an intermediate differential mechanism, in which said prime-mover constitutes a rotary housing for said differential mechanism and a means for driving said shafts through said differential mechanism.

A further object is to provide a differential driving unit of the above character in which the opposed driven shafts and the entire differential mechanism are disposed within a hollow prime-mover with said driven shafts extending outwardly from opposite ends of the bore of said prime-mover.

Another object is to provide a prime-mover which is transversely split into two detachable sections so as to facilitate assembling of the differential mechanism within its bore.

Another object is to utilize as the prime-mover the main drive shaft of a motor or engine, and to adapt the mechanism for association with a prime-mover constituting a hollow or tubular engine crank-shaft of the eccentric-crank type, and a further object is to provide brake mechanism associated with driven shafts and anchored directly on the motor or engine structure.

Another object is to provide a differential driving mechanism which, while adapted for use in various situations, is particularly adaptable for use in motor vehicle constructions in which the motor or engine is disposed with its drive or crank-shaft arranged transversely of the vehicle frame and in substantial alignment with the driven wheels, and in such constructions and in similar situations where the motor or engine must occupy a central position and where the available space is limited, it becomes a further object to provide a mechanism of compact balanced design including a minimum number of parts.

Various other objects and advantages will be more fully apparent from the following description of the accompanying drawings which form a part of this disclosure and which illustrate a preferred form of embodiment of the invention.

Figure 1:
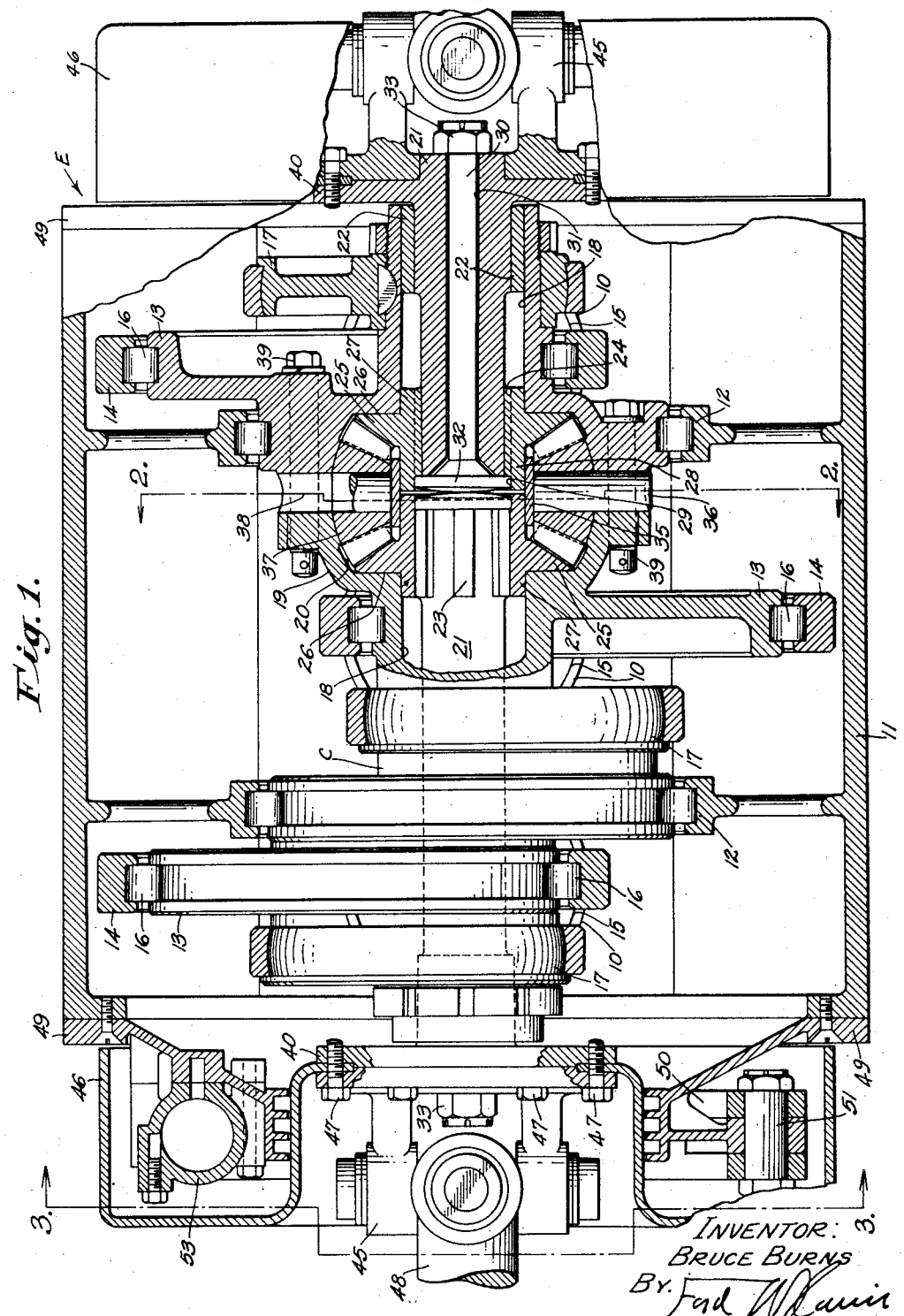
Fig. 1 is a partial transverse vertical section taken through the crank-shaft of a horizontal engine, the differential mechanism of the present invention being incorporated in said crank-shaft.
Figure 2:
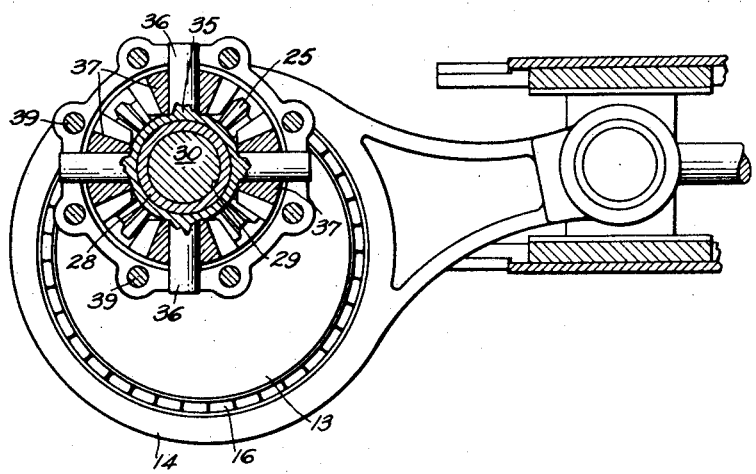
Fig. 2 is a section, on a reduced scale, taken on the line 2—2 of Fig. 1.
Figure 3:
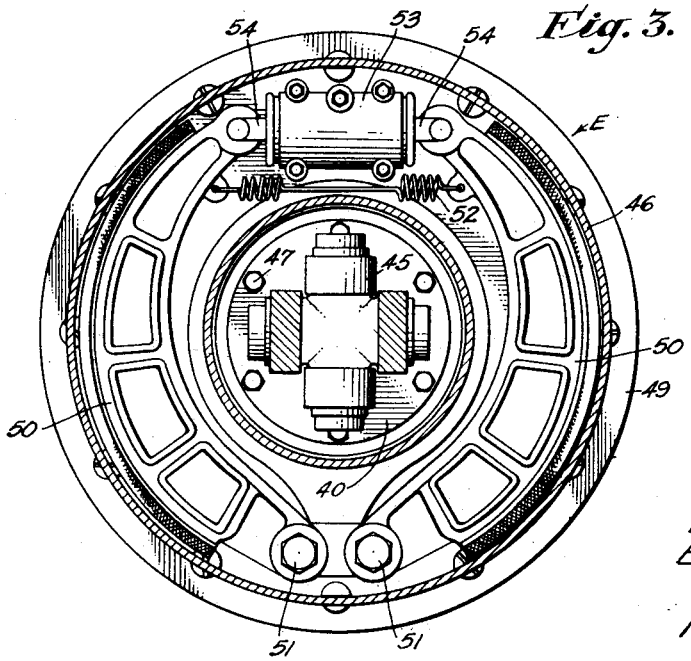
Fig. 3 is a section, on a reduced scale, taken on the line 3—3 of Fig. 1.

In Figs. 1 to 3 of the drawings I have illustrated the differential mechanism associated with the crank-shaft of a horizontal engine and in this instance the engine E has three cylinders 10 communicating with a crank-case 11 containing two relatively spaced crank-shaft bearings 12 in which the crank-shaft C is journaled.

The crank-shaft, which is of the eccentric-crank type, has three eccentric cranks 13 circularly spaced 120° apart, and these cranks are of circular contour and are each embraced by the outer end of a connecting rod 14 operatively associated with a piston 15 of the respective cylinder 10, anti-friction bearings 16 being provided between the respective cranks and connecting rods, if desired. The crank-shaft bearings 12 may also be of similar anti-friction character and the crankshaft may be provided with valve operating eccentrics 17 if the engine is of such character as to require them. The operation of the pistons and connecting rods to rotate the crank-shaft will be quite obvious without a detailed explanation thereof.

The crank-shaft C is hollow or made tubular by being provided with an axial bore 18 extending throughout its length and has an enlarged portion 19 which serves as a differential housing, the crank-shaft bore being enlarged at this point to provide a gear chamber 20 in which the differential gearing is located.

The differential mechanism is carried by the crank-shaft and includes two opposed driven shafts 21 journaled in axial alignment in the bore 18 of the crank-shaft with their inner ends disposed in the gear chamber 20 and their respective outer ends extending outwardly from the outer ends of the crankshaft bore. In the specific construction disclosed in Fig. 1, each shaft 21 is journaled in a bearing 22 secured in the bore 18 and is provided with a splined inner end; that is, its inner end has formed thereon a circular series of longitudinal teeth 23, and these teeth or splines intermesh with a companion series of teeth or splines 24 formed within the bore of a differential beveled gear 25, thus securing said gear against rotation on said shaft. The outer radial surface 26 of each gear 25 engages the adjacent end wall of the gear chamber and beyond such radial surface is provided with an outer hub portion 27 which journals in the bore 18 of the crank-shaft. Also each gear 25 has an inner hub portion 28, these inner hub portions closely approaching each other at the transverse center of the gear chamber.

Each of the driven shafts 21, at its inner end, terminates at a point spaced outwardly from the inner end of the hub portion 28 of the respective gear 25, and the teeth or splines 24 of said gear also terminate at this point so that said gear has a smooth bore 29 beyond the inner end of said shaft.

To prevent axial displacement of the driven shafts 21 and the gears 25 I provide each of said shafts with an axial retaining rod or bolt 30. In each instance this rod 30 extends through a longitudinal bore 31 in the respective shaft 21 and has a circular head 32 at its inner end disposed within the smooth bore 29 of the associated beveled gear 25, the inner end of said head being convexed to provide a thrust bearing surface.

With the mechanism in the assembled condition shown, the convex ends of the two retaining rods 30 engage each other and the head 32 of each rod engages the inner end of its respective driven shaft 21 and also the inner ends of the several teeth or splines 24 of the associated beveled gear 25, and each rod is clamped in this position by a nut 33 screwed on its outer end and engaging the outer end of the shaft 21.

This arrangement maintains these parts against displacement in the crank-shaft and also presents certain other advantages which will later be explained.

In the gear chamber 20 there is a spider 35 which is disposed between the two beveled gears 25 and surrounds and forms a bearing for the inner hub portions 28 thereof, this spider including four circularly spaced radially disposed studs 36 upon which are rotatably journaled four bevel planetary pinions 37 meshing with the teeth of both of the bevel gears 25.

The spider 35 is secured in the crank-shaft C and to facilitate assembling, the crank-shaft is transversely split at the center of its gear housing portion 19, as indicated at 38, to thus divide the crank-shaft into two separable sections, and the meeting faces of these sections each have four circularly spaced semi-cylindrical radially disposed depressions to accommodate the four studs 36 of the spider 35. When the mechanism is assembled these depressions cooperate to form radial bores in the crank-shaft in which bores the outer ends of the spider studs 36 engage, the two crank-shaft sections being clamped together as a rigid unit by a series of circularly spaced bolts 39.

Each driven shaft 21 has a radially disposed flange 40 on its outer end, beyond the crankshaft C, and duplicate mechanisms are associated with the flanges of both of the shafts 21; therefore, a description of one of such mechanisms will suffice herein.

In the construction illustrated, a universal joint member 45 and the hub portion of a brake drum 46 are secured to the flange 40 of the driven shaft 21 by screws 47 and said joint member has a universal connection with a driven shaft extension 48 leading to the element or mechanism to be driven by the engine. For instance, the two shaft extensions 48 may in a motor vehicle construction be operatively connected to the opposed drive wheels.

The brake mechanism associated with the brake drum 46 is supported upon an end plate 49 of the crank-case 11 and preferably consists of two oposed brake shoes 50 (see Fig. 3), each pivoted on a stud 51 carried by the plate 49, and both normally retracted from braking engagement with the brake drum 46 by a spring 52 connected at opposite ends to the respective shoes.

Various other specific types of brake mechanism may be employed and the brake operating means may be either mechanical or hydraulic, the operating means herein disclosed being an hydraulic means consisting of a brake operating cylinder 53 which may be connected by conduit means with a suitable source of brake operating fluid, and which contains suitable opposite piston rods 54 arranged to engage and force the brake shoes 50 into braking engagement with the brake drum.

A particular advantage of so locating the brake mechanism is that the braking elements are anchored directly upon the engine structure which is designed to withstand high torque loads and thus there is no need to provide separate sturdy brake anchoring means.

In assembling this prime-mover or crank-shaft unit, the beveled gears 25 and the retaining rods 30 are inserted in the separate crank-shaft sections from the gear chamber ends, the spider 35 with its pinions 37 in place upon the spider studs 36 is placed in position in one of the crank-shaft sections, and the two crank-shaft sections are then brought together and secured by the bolts 39. Each driven shaft 21 is then inserted into the crank-shaft bore 18 through the bearing 22, the bore of said bearing being slightly larger than the inner spline end of said shaft 21, and when the inner spline end of said shaft is fully engaged in the splined bore of the respective beveled gear 25, the nut 33 is applied and screwed up tight.

By this arrangement the driven shafts 21 may be separately removed at any time by merely removing the respective nut 33 and withdrawing the associated shaft 21 from its gear 25 and from the bore of the crank-shaft, it of course being obvious that the universal joint members 45 and the associated brake drums 46 may at any time be removed from the respective driven shaft flanges 40 without disturbing the shafts 21.

Figure 4:
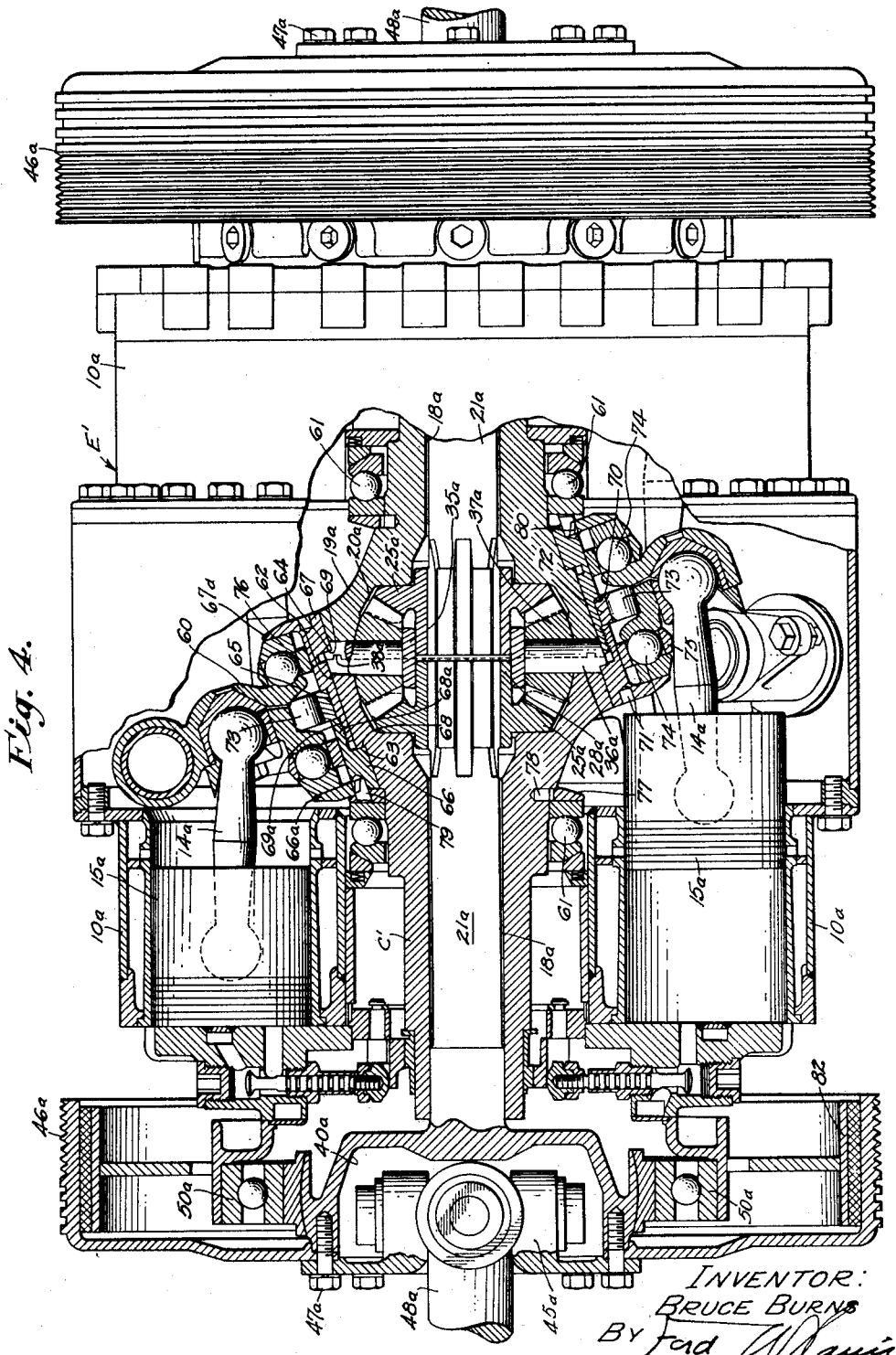
Fig. 4 is an elevation, partly broken and in section, showing the differential mechanism of the present invention incorporated in a swash-plate engine.

In Fig. 4 I have shown the prime-mover differential of the invention as applied to an engine E' of the swash-plate type, and in this adaptation I have illustrated an engine of the opposed cylinder type in which two opposed banks of axially disposed cylinders 10a are provided with pistons 15a having connecting rods 14a operatively connecting with a swash or wobble plate 60 asociated with the prime-mover or engine shaft C'. This engine shaft is rotatably journaled in the engine structure and is provided with suitable thrust bearings 61.

As in the previously described construction, the engine shaft C' is hollow or made tubular by being provided with an axial bore 18a extending throughout its length and has an enlarged portion 19a which serves as a differential housing, the engine shaft bore being enlarged at this point to provide a gear chamber 20a in which the differential gearing is located.

The differential mechanism is substantially the same as that previously described and includes two opposed driven shafts 21a journaled in the bore 18a of the engine shaft and having beveled differential gears 25a splined on their inner ends. These gears 25a are oppositely disposed within the gear chamber 20a and have inner hub portions 28a journaled in a spider 35a which is provided with radially disposed studs 36a carrying beveled planetary pinions 37a meshing with both of the gears 25a.

The engine shaft C' is also transversely split at the center of its gear housing portion 19a, as indicated at 38a, to thus divide the engine shaft into two separable sections, and the meeting faces of these sections each have four circularly spaced semi-circular radially disposed depressions to accommodate the four studs 36a of the spider 35a. When the mechanism is assembled these depressions cooperate to form radial bores in the engine shaft, in which bores the outer ends of the spider studs 36a engage, the two engine shaft sections then being clamped together by the means which will now be described.

The central enlarged differential housing portion 19a of the engine shaft in the region of the transverse split 38a is turned to provide a circular seat 62 which is angularly disposed in relation to the axis of the engine shaft and this seat is formed to provide opposed annular abutment shoulders 63 and 64 on opposite sides of the transverse split 38a. To clamp the two sections of the engine shaft rigidly together and also to form an annular bearing race-way 65, I provide opposed annular bushings or clamp rings 66 and 67.

The clamp ring 66 has an annular radially disposed flange 66a and is provided with an internal annular shoulder 68 and an internally threaded inner end 68a, and the clamp ring 67 has a similar radially disposed flange 67a, an internal annular shoulder 69, an external annular shoulder 70, and an externally threaded inner end 69a.

When these clamp rings are in place, the internal annular shoulder 68 of the clamp ring 66 engages the annular abutment shoulder 63 on the seat 62 of the engine shaft and the internal annular shoulder 69 of the opposed clamp ring 67 engages the annular abutment shoulder 64 on said seat with the threaded inner ends of these clamp rings cooperating to draw the two engine shaft sections tightly together, the outer surfaces of said clamp rings being provided with circularly spaced depressions 71 to accommodate suitable wrenches for accomplishing this screwing up of the two rings.

Clamped between the inner end of the clamp ring 66 and the external annular shoulder 70 of the clamp ring 67 is an inner bearing race 72 and between this race and the swash-plate 60 is a series of radial anti-friction roller bearings 73.

Between the opposite sides of the swash-plate 60 and the flanges 66a and 67a of the respective clamp rings 66 and 67, I provide thrust bearings, each comprising a series of ball bearings 74 disposed in a ball retainer 75 between an outer annular ball race 76 engaging the respective clamp ring flange, and an annular ball groove formed on the swash-plate 60. Thus the engine shaft C' is rotatably journaled in relation to the non-rotative swash-plate.

In order to maintain the clamp rings 66 and 67 against rotation relative to the engine shaft, I provide two lock rings 77, each cooperating with one of said clamp rings. Each lock ring is keyed to the engine shaft by a key 78 and is provided with a retaining stud 79 secured therein and projecting therefrom in a general axial direction at an angle corresponding to the angular disposition of the circular seat 62 on the engine shaft. The outer corner of said retaining stud 79 is rounded off as indicated at 80 so that when the lock ring 77 is slid axially on the engine shaft towards the adjacent clamp ring, the stud 79 will enter one of the depressions 71 and maintain said clamp ring from rotation on the engine shaft.

Each of the driven shafts extends outwardly from the bore of the engine shaft and has a cup-shaped portion 40a, and secured thereto by screws 47a is a universal joint member 45a and a brake drum 46a, said joint member having a universal connection with a driven shaft extension 48a leading to the element or mechanism to be driven. Each cup-shaped portion 40a is journaled in a bearing 50a in the engine structure and a suitable brake mechanism 82 is associated with the brake drum 46a.

In the ordinary type of differential drive, such as is employed in standard motor vehicle construction, the prime-mover or engine shaft is disposed longitudinally of the vehicle and the opposed driven shafts with their intermediate differential gears are journaled in a stationary transverse axle and differential housing, the intermediate differential including a gear on the inner end of each driven shaft, both gears meshing with one or more planetary pinions carried by a spider which is also rotatably journaled in the stationary housing. Such spider usually carries a ring gear meshing with a drive pinion on the longitudinally disposed drive or propeller shaft leading to the clutch which is interposed between it and the engine crank-shaft.

This arrangement requires a stationary oil-tight differential housing and in operation the driven shafts and gears and the ring gear and spider all rotate in their individual bearings under load during a normal drive as well as during a compensating drive. Thus these parts will always rotate under load and during a normal drive will cause objectionable noise and wear.

Applying the differential drive principle in instances where the prime-mover and the driven shafts extend in the same direction, such as in a motor vehicle having the motor transversely disposed between the two driven wheels, it has been proposed to utilize a similar arrangement as a differential counter-shaft bridging around the motor and including an ordinary form of "jack-in-the-box" differential unit in a separate differential housing, with the counter-shaft sections connected directly or by gear trains to the opposite driven wheels.

This proposed arrangement retains the principle of the standard motor vehicle differential arrangement above referred to, in that it requires a separate oil-tight differential housing with its attendant problems of maintaining proper alignment of the parts and in that the driven shafts and gears and the ring gear and spider as well as the gears of the several connecting gear trains all individually rotate under load during a normal drive.

The utility of such counter-shaft constructions is limited to those situations in which economy of space and compactness of design is not an important consideration and where a multiplicity of parts is not objectionable, while in the arrangement herein disclosed a maximum compactness of design and of elimination of parts is attained.

One of the most important features of the arrangement herein disclosed is the fact that the entire differential mechanism is carried within the prime-mover or engine-shaft so that under normal drive conditions no part of the differential mechanism rotates individually in relation to the other parts thereof; that is, all of these parts remain stationary relative to the prime-mover and are bodily carried by the engine shaft as a unit during the normal drive so that during the majority of the time the engine shaft is in operation there will be no frictional wear on the several parts of the differential mechanism, the only frictional wear on such parts being due to their individual rotation which takes place only during a compensating drive.

While the mechanism herein disclosed is fully capable of fulfilling all of the objects primarily stated, it is to be understood that I do not wish to limit the present invention to the specific embodiments illustrated in the drawings for it is susceptible of embodiment in various other forms, all coming within the scope of the claims which follow.

I claim as my invention:

1. In a prime-mover differential mechanism, the combination of: an engine crank-shaft of the eccentric-crank type provided with a longitudinal bore having an intermediate enlarged portion and being transversely split at said enlarged portion of said bore to form separable sections; opposed driven shafts journaled to rotate in the opposite ends of said bore; differential transmission mechanism disposed within the enlarged portion of said bore and betwen the separable sections of said crank-shaft and forming a differential driving connection between said driven shafts and said crank-shaft; and means for securing the separable sections of said crank-shaft together, said differential transmission mechanism including a gear secured to the inner end of each driven shaft and provided with an inwardly extending hub portion, a differential spider secured between the separable sections of said crank-shaft and rotatably mounted upon said hub portion of said gears, and at least one planetary pinion journaled on said spider and meshing with both of said gears.

2. In a prime-mover differential mechanism, the combination of: a hollow prime-mover; opposed driven elements journaled to rotate in said prime-mover; differential transmission mechanism within said prime-mover and forming a differential driving connection between said driven elements and said prime-mover; and a brake mechanism associated with each of said driven elements.

3. In a prime-mover differential mechanism, the combination of: a prime-mover provided with a longitudinal bore; opposed driven shafts journaled to rotate in the opposite ends of said bore; differential transmission mechanism disposed within said bore and forming a differential driving connection between said driven shafts and said prime-mover; and a brake mechanism associated with each of said driven shafts.

4. In a prime-mover differential mechanism, the combination of: an engine drive-shaft provided with an axial bore; a casing enclosing said drive-shaft; opposed driven shafts journaled to rotate in the opposite ends of said bore; differential transmission mechanism disposed within said bore and forming a differential driving connection between said driven shafts and said drive-shaft; and a brake mechanism associated with each of said driven shafts and anchored to said casing.

5. In a prime-mover differential mechanism the combination of: an engine crank-shaft provided with an axial bore; a crank-case enclosing said crank-shaft; opposed driven shafts journaled to rotate in the opposite ends of said bore; differential transmission mechanism disposed within said bore and forming a differential driving connection between said driven shafts and said crank-shaft; a brake-drum attached to each of said driven shafts; and braking members disposed in each of said drums and adapted for expansion to engage said drums, said braking members being attached to said crank-case.

6. In a prime-mover differential mechanism, the combination of: an engine drive-shaft provided with a longitudinal bore; opposed driven shafts journalled to rotate in the opposite ends of said bore, each of said driven shafts having a passage therethrough; differential transmission mechanism disposed within said bore and forming a differential driving connection between said driven shafts and said drive-shaft, said differential transmission mechanism including a gear secured to each driven shaft and at least one planetary pinion carried by said drive-shaft and meshing with both of said gears; and a retaining member disposed in said passage in each of said driven shafts and engaging said gear and the inner end of said driven shaft for retaining said driven shaft in proper position relative to said driving shaft.

7. In a prime-mover differential mechanism, the combination of: an engine drive-shaft provided with a longitudinal bore; opposed driven shafts journalled to rotate in the opposite ends of said bore, each of said driven shafts having a passage therethrough; differential transmission mechanism disposed within said bore and forming a differential driving connection between said driven shafts and said drive-shaft, said differential transmission mechanism including a gear secured to each driven shaft and at least one planetary pinion carried by said drive-shaft and meshing with both of said gears; and a retaining member disposed in each of said passages and so associated with one of said gears as to secure said associated driven shaft against movement out of said bore.

8. In a prime-mover differential mechanism, the combination of: an engine drive-shaft provided with a longitudinal bore; opposed driven shafts journalled to rotate in the opposite ends of said bore, each of said driven shafts having a passage therethrough; differential transmission mechanism disposed within said bore and forming a differential driving connection between said driven shafts and said drive-shaft, said differential transmission mechanism including a gear secured to each driven shaft and at least one planetary pinion carried by said drive-shaft and meshing with both of said gears; and a retaining member secured in each of said passages and so associated with one of said gears as to secure said associated driven shaft against movement out of said bore, said retaining member being releasable from the outer end of said driven shaft to permit the removal of said driven shaft outwardly through said bore.

9. In a prime-mover differential mechanism, the combination of: an engine drive-shaft provided with a longitudinal bore; opposed driven shafts journalled to rotate in the opposite ends of said bore, each of said driven shafts having a passage therethrough; differential transmission mechanism disposed within said bore and forming a differential driving connection between said driven shafts and said drive-shaft, said differential transmission mechanism including a gear secured to each driven shaft and at least one planetary pinion carried by said drive-shaft and meshing with both of said gears; and a retaining member removably secured in each of said passages and so associated with one of said gears as to secure said associated driven shaft against movement out of said bore, said retaining members so engaging each other as to secure said driven shafts against movement towards each other.

10. In a prime-mover differential mechanism, the combination of: a hollow engine drive-shaft; opposed driven elements adapted for rotation within said drive-shaft; differential transmission mechanism disposed within said hollow drive-shaft and forming a differential driving connection between said driven elements and said drive-shaft, said differential transmission mechanism including a gear secured to each driven element and a planetary pinion carried by said drive-shaft and meshing with both gears; and retaining means for maintaining said driven elements and said gears in proper position in said drive-shaft, said means being releasable from the outside of said drive-shaft.

11. In a prime-mover differential mechanism, the combination of: a drive-shaft having a bore therein; a casing around said drive-shaft; opposed driven shafts adapted for rotation in said bore; differential transmission mechanism disposed within said bore and forming a differential driving connection between said driven shafts and said drive-shaft, said differential mechanism including a gear provided on each of said driven shafts and a planetary pinion carried by said drive-shaft and meshing with both gears; and retaining means associated with each of said driven shafts for retaining said driven shaft and its companion gear in proper position in said bore, said retaining means being operable from the exterior of said casing for releasing said driven shaft and its companion gear.

12. In a prime-mover differential mechanism, the combination of: an engine drive-shaft having a longitudinal bore with an intermediate enlarged portion, said drive-shaft being transversely split at said enlarged portion of said bore to provide separable sections; locking means for securing said separable sections of said drive-shaft together, said locking means providing a swash-plate receiving portion; opposed driven shafts adapted for rotation in the opposite ends of said bore; differential transmission mechanism disposed within the enlarged portion of said bore and between the separable portions of said drive-shaft and forming a differential driving connection between said driven shafts and said drive-shaft; and means for securing the separable sections of said drive-shaft together.

In testimony whereof, I have hereunto set my hand at Los Angeles, California, this 11th day of July, 1930.

BRUCE BURNS.